(12) United States Patent
Zecha et al.

(10) Patent No.: US 7,649,067 B2
(45) Date of Patent: Jan. 19, 2010

(54) PROCESS OF MAKING A VINYL ESTER BASED POLYMER LATEX COMPOSITION

(75) Inventors: Helmut Zecha, Burghausen (DE); Holger Kuenstle, Burghausen (DE)

(73) Assignee: Wacker Polymers, L.P., Allentown, PA (US)

( * ) Notice: Subject to any disclaimer, the term of this patent is extended or adjusted under 35 U.S.C. 154(b) by 630 days.

(21) Appl. No.: 11/254,099

(22) Filed: Oct. 19, 2005

(65) Prior Publication Data

US 2007/0088120 A1    Apr. 19, 2007

(51) Int. Cl.
*C08F 255/02* (2006.01)
*C08F 263/02* (2006.01)
*C08F 291/00* (2006.01)
*C08L 51/00* (2006.01)

(52) U.S. Cl. .......................... 526/331; 526/87; 526/287; 526/304; 526/307.6; 526/307.8; 526/318.42; 526/318.45; 526/318.5

(58) Field of Classification Search .................. 526/331, 526/87, 287, 304, 307.6, 307.8, 318.42, 318.45, 526/318.5
See application file for complete search history.

(56) References Cited

U.S. PATENT DOCUMENTS

| | | | |
|---|---|---|---|
| 3,345,318 A | 10/1967 | Lindemann et al. | |
| 3,380,851 A | 4/1968 | Lindemann et al. | |
| 3,440,200 A | 4/1969 | Lindemann et al. | |
| 3,954,724 A | 5/1976 | Nakashio et al. | |
| 4,316,830 A | 2/1982 | Mallon | |
| 4,332,850 A | 6/1982 | Iacoviello | |
| 4,440,897 A | 4/1984 | Maska | |
| 4,447,570 A | 5/1984 | Cook et al. | |
| 4,745,025 A | 5/1988 | Mao | |
| 5,109,063 A | 4/1992 | Cheng et al. | |
| 5,540,987 A * | 7/1996 | Mudge et al. ................. 442/59 |
| 5,763,033 A | 6/1998 | Tropsha et al. | |
| 5,889,101 A | 3/1999 | Schlarb et al. | |
| 6,117,960 A | 9/2000 | Kohlhammer et al. | |
| 6,174,568 B1 | 1/2001 | Kohlhammer et al. | |
| 6,787,594 B1 | 9/2004 | Goldstein et al. | |
| 2003/0176133 A1 | 9/2003 | Walker et al. | |
| 2004/0077782 A1 | 4/2004 | Heldmann et al. | |
| 2004/0132939 A1 | 7/2004 | Kaspar et al. | |
| 2004/0147190 A1 * | 7/2004 | Goldstein et al. ........... 442/123 |

FOREIGN PATENT DOCUMENTS

| | | |
|---|---|---|
| CA | 2053005 | 4/1992 |
| CA | 2066988 | 10/1992 |
| DE | 2512589 A1 | 9/1976 |
| DE | 4032096 A1 | 4/1992 |
| DE | 4113839 A1 | 10/1992 |
| DE | 4432945 A1 | 3/1994 |
| DE | 4240731 A1 | 6/1994 |
| DE | 19631935 A1 | 2/1998 |
| DE | 19751553 A1 * | 7/1999 |
| DE | 19821774 A1 | 11/1999 |
| DE | 10204234 A1 | 8/2003 |
| EP | 0237643 A | 9/1987 |
| EP | 0609849 A1 | 8/1994 |
| EP | 672073 B1 | 7/1996 |
| EP | 0727441 B1 | 6/1998 |
| EP | 1392744 | 3/2004 |
| EP | 1 479 699 A1 | 11/2004 |
| EP | 1370621 B1 | 12/2004 |
| WO | WO 02/088207 A1 | 11/2002 |

* cited by examiner

*Primary Examiner*—Kelechi C Egwim
(74) *Attorney, Agent, or Firm*—RatnerPrestia

(57) ABSTRACT

The present invention relates to a vinyl ester based polymer latex composition obtainable by free radical emulsion polymerization in substantial absence of a protective colloid and in the presence of no or small amounts of a surfactant, and to a process of making the same. The invention further pertains to a dispersion incorporating said vinyl ester based polymer latex composition, products comprising said dispersion, and various uses of the dispersion.

8 Claims, No Drawings

PROCESS OF MAKING A VINYL ESTER BASED POLYMER LATEX COMPOSITION

The present invention relates to a vinyl ester based polymer latex composition obtainable by free radical emulsion polymerization in substantial absence of a protective colloid and in the presence of no or small amounts of a surfactant, and to a process of making the same. The invention further pertains to a dispersion incorporating said vinyl ester based polymer latex composition, products comprising said dispersion, and various uses of the dispersion.

BACKGROUND OF THE INVENTION

Vinyl ester based polymer latex compositions, and especially vinyl acetate/ethylene based polymer latex compositions are well known in the art. Such compositions have been made and used for decades as adhesives, especially for paper and packaging, wood glues, in paints, coatings and inks, for treating leather, or for bonding fabrics, especially non-woven fabrics.

The rapid increase in sales of disposable non-woven products in the past has intensified interest in improving emulsion polymers used to bind these non-wovens. Special emphasis has been put on wet tensile strength of the bonded non-woven product, since this is an important factor in consumer acceptance and utility. Such non-wovens include for example diapers, sanitary napkins, medical gowns, wipes, tabletops or other products requiring a certain tensile strength in the wet state.

Emulsion copolymers prepared from vinyl acetate, ethylene and a crosslinker, mainly N-methylol acrylamide, when applied to an non-woven substrate, often exhibit unacceptable loss in strength in the presence of water and organic solvents. They further often have unacceptably short shelf life, or suffer from lack of latex stability. They may further provide insufficient adhesion strength to a substrate. Such shortcomings limit the use of these formulations in many commercial and industrial applications. Consequently, the non-wovens industry has been searching for a latex composition used as a binder which can overcome these limitations.

Numerous formulations have been developed in an effort to overcome the above problems associated with vinyl acetate/ethylene (VAE) emulsions. The most successful approaches use N-methylol acrylamide as a co-monomer for crosslinking vinyl acetate and ethylene. Colloidal stability of the resulting dispersion has been addressed by using surfactants and/or protective colloids during emulsion polymerization of vinyl acetate and ethylene. Examples of this art include US patent application publication 2003/0, 176, 133; U.S. Pat. Nos. 3,380,851; 3,345,318; 3,440,200; 4,332,850; and 5,109,063; German laid open publications 25 12 589; 42 40 731 (EP 672,073 corresponds); 44 32 945 (U.S. Pat. No. 5,763,033 corresponds); or 196 31 935 (U.S. Pat. No. 6,174,568 corresponds); and European patent application 0 609 849.

The use of certain surfactants in such compositions, especially when used in formulations of paints, coatings, inks, adhesives or for bonding nonwovens has recently been identified as a possible cause of environmental problems. Several attempts have thus been undertaken to avoid the use of surfactants for stabilizing vinyl acetate based polymer latex compositions. In many cases stabilization is provided by a protective colloid instead of or in addition to the surfactant. Examples of corresponding art include German laid open publications 41 13 839 (CA 2066988 corresponds); 102 04 234; 40 32 096 (CA 2053005 corresponds); and 198 21 774; European patent applications 1 392 744 (US patent application publication 2004-0132939 corresponds); and 0 727 441 (U.S. Pat. No. 5,889,101 corresponds); and U.S. Pat. Nos. 4,440,897; 4,316,830; 6,117,960; 4,745,025; and 3,954,724. The use of a protective colloid adds complexity to the system, increases costs, and may cause a deterioration of other desirable properties. For instance it may cause yellowing of a bonded nonwoven.

In view of the above it is the object of the present invention to provide a vinyl acetate based polymer latex which is substantially free of a protective colloid, which is also substantially free of a surfactant or comprises only minor amounts of the same. It is further an object of the present invention to provide a vinyl ester based polymer latex which, when used for bonding non-wovens, allows for improved wet tensile strength of the bonded product.

BRIEF SUMMARY OF THE INVENTION

These objects are achieved and other disadvantages of the art are overcome by the present invention. A first aspect of the invention thus provides a vinyl ester based polymer latex composition obtainable by free radical emulsion polymerization of a vinyl ester monomer, an ethylene monomer, and a post-crosslinking monomer, wherein the latex composition is substantially free of protective colloid and contains 0-0.1 wt. % surfactant, based on the total weight of monomers. Most preferably the latex composition comprises no surfactant.

In one embodiment, the latex composition of the invention comprises 20-96 wt. % or 40-96 wt. %, preferably 40-95.3 wt. %, more preferably 60-93.3 wt. % vinyl ester monomer, 3-60 wt. % or 3-40 wt. %, preferably 5-30 wt. % ethylene monomer, 1-20 wt. %, preferably 1-10 wt. % of a post-crosslinking monomer, 0-5 wt. %, preferably 0.2-2 wt. % of a vinyl sulfonate monomer, and 0-5 wt. %, preferably 0.5-2 wt. % of unsaturated carboxylic acid monomer, wherein all percentages are based on the total weight of the monomers. In this embodiment the surfactant content may even be up to 1.0 wt. % ($\leq 1.0$ wt. %), preferably up to 0.5 wt. % ($\leq 0.5$ wt. %), based on the total weight of the monomers.

The latex composition may further comprise:

(f) 0-30 wt.-% of at least one copolymerizable monomer selected from the group consisting of monomers X, Y, and Z, based on the total weight of the monomers, wherein:
  (i) said monomer X is selected from the group consisting of an $C_{1-10}$ alkyl acrylate monomer, and mixtures thereof,
  (ii) said monomer Y is selected from the group consisting of a vinyl-$C_{5-18}$ acyl ester, an unsaturated dicarboxylic acid $C_{1-10}$ mono- and dialkyl ester, an unsaturated dicarboxylic acid anhydride, an unsaturated dicarboxylic acid mono- or diacid halide, and mixtures thereof, and
  (iii) said monomer Z is selected from the group consisting of a mono-ethylenically unsaturated, water soluble functional monomer, a poly-ethylenically unsaturated pre-crosslinking monomers, a chain transfer agent, and mixtures thereof, In a second aspect thereof the present invention provides a process of emulsion polymerization for producing a vinyl ester based polymer latex composition by free radical emulsion polymerization in an aqueous medium of a vinyl ester monomer, an ethylene monomer, and a post crosslinking monomer, which process is carried out substantially in the absence of any protective colloid, and in the presence of 0-0.1 wt. % surfactant, based on the total weight of monomers. Preferably, no surfactant is present during polymerization.

In a preferred embodiment the process is a semi-continuous emulsion polymerization comprising (i) a first stage of providing an initial reactor charge including part of the monomers, and (ii) a second stage of feeding any remaining monomers and optionally a polymerization initiator system in one or more feeds to the initial charge under polymerization conditions.

More preferably, in said semi-continuous process the initial reactor charge comprises an aqueous phase containing
- at least a fraction of the total amount of the vinyl ester monomer,
- at least a fraction, but preferably all of the ethylene monomer,
- at least a fraction of the post-crosslinking monomer, and
- if present, at least a fraction, but preferably all of a vinyl sulfonate monomer.

The invention also provides a process of emulsion polymerization for producing a vinyl ester based polymer latex composition by semi-continuous free radical emulsion polymerization in an aqueous medium of a vinyl ester monomer, an ethylene monomer, and a post crosslinking monomer, which process is carried out substantially in the absence of any added protective colloid, and in the presence of $\leq 1.0$ wt. % surfactant, based on the total weight of the monomers, wherein the employed monomers comprise:

20-96 wt. % or 40-96 wt. %, preferably 40-95.3 wt. %, vinyl ester monomer, 3-60 wt. % or 3-40 wt. %, preferably 5-30 wt. %, ethylene monomer, 1-20 wt. %, preferably 1-10 wt. %, of a post-crosslinking monomer, 0-5 wt. %, preferably 0.2-2 wt. %, vinyl sulfonate monomer, 0-5 wt. %, preferably 0.5-2 wt. %, of unsaturated carboxylic acid monomer, and (f) 0-30 wt. %, preferably 1-10 wt. %, of at least one copolymerizable monomer selected from the group consisting of monomers X, Y, and Z, wherein all percentages are based on the total weight of the monomers, and the total weight of the monomers is 100 wt. %, and wherein:
(i) said monomer X is selected from the group consisting of an $C_{1-10}$ alkyl acrylate monomer, and mixtures thereof,
(ii) said monomer Y is selected from the group consisting of a vinyl-$C_{5-18}$ acyl ester, an unsaturated dicarboxylic acid $C_{1-10}$ mono- and dialkyl ester, an unsaturated dicarboxylic acid anhydride, an unsaturated dicarboxylic acid, mono- or diacid halide, and mixtures thereof, and said monomer Z is selected from the group consisting of a mono-ethylenically unsaturated, water soluble functional monomer, a poly-ethylenically unsaturated pre-crosslinking monomer, a chain transfer agent, and mixtures thereof, said process comprising:
(i) a first stage of providing an initial reactor charge including part of the monomers, and
(ii) a second stage of feeding any remaining monomers and optionally a polymerization initiator system in one or more feeds to the initial charge, wherein the initial charge comprises an aqueous phase containing:
- at least a fraction of the total weight of the vinyl ester monomer,
- at least a fraction, but preferably all of the ethylene monomer,
- at least a fraction of the post-crosslinking monomer, and
- if present, at least a fraction, but preferably all of the vinyl sulfonate monomer.

The present invention also provides for a dispersion comprising the latex composition as described above or obtained by the above process, as well as several products comprising the same and uses thereof.

DETAILED DESCRIPTION OF THE INVENTION

The present invention is based on the surprising finding that colloidal stable vinyl acetate based polymer latex compositions can be obtained in the substantial absence of a stabilizing protective colloid and also in the presence of only minor amounts of a surfactant, if any.

Colloidal stability of the latex composition can be obtained by carefully adjusting monomer composition of the latex to include a vinyl ester monomer, an ethylene monomer, and a post-crosslinking monomer. Colloidal stability may further be enhanced by polymerizing these monomers in a semi-continuous polymerization process, wherein the monomers are partitioned to the initial charge and any feeds or delays added in the second stage thereof.

The possibility of avoiding both a protective colloid and a surfactant has the benefit of meeting the market demand of more environmentally friendly products. The latex composition of the present invention also provides surprisingly increased wet tensile strength to a non-woven product bonded therewith, compared to a non-woven bonded with a conventional latex composition binder comprising a surfactant and/or protective colloid.

A first aspect of the invention thus provides a vinyl ester based polymer latex composition obtainable by free radical emulsion polymerization of a vinyl ester monomer, an ethylene monomer, and a post-crosslinking monomer, wherein the latex composition is substantially free of protective colloid and contains 0-0.1 wt. % surfactant, based on the total weight of monomers. Most preferably the latex composition comprises no surfactant.

The vinyl ester monomer is selected from the group consisting of vinyl esters, preferably vinyl-$C_{1-18}$-acyl esters, vinyl halides and mixtures thereof. The term vinyl halide includes as the condensation product of vinyl alcohol and a mineral acid such as HF, HCl, HBr, and HI; vinyl chloride being the preferred vinyl halide. More preferably the vinyl ester monomer is selected from the group consisting of vinyl acetate, vinyl propionate, vinyl pivalate, vinyl versatate, vinyl laurate, vinyl chloride, and mixtures thereof, and most preferably is vinyl acetate. The vinyl ester monomer is used in an amount of 20-96 wt. % or 40-96 wt. %, preferably 40-95.3 wt. %, more preferably 60 to 93.3 wt. % or 60-90.3 wt. % based on total weight of the monomers of the latex.

The latex composition of the present invention further includes 3-60 wt. % or 3-40 wt. %, more preferably 5-30 wt. % ethylene monomer, based on the total weight of monomers. The ethylene monomer preferably consists of ethylene as the only monomer, but may include minor amounts, e.g., up to 10 wt. %, based on total ethylene monomer, of other ethylenically unsaturated $C_{2-10}$ olefins such as propylene, butylenes, hexene, cyclohexene, octene, decene and others. Due to the mandatory content of ethylene, the polymerization for obtaining the product is carried out under pressure and may hence also be considered a pressure emulsion polymerization reaction.

The post-crosslinking monomer comprised in the inventive latex composition may be any monomer capable of crosslinking the polymer during and/or after application of the final latex or dispersion. It is preferably selected from the group consisting of N-alkylol (meth)acrylamides, N-alkoxyalkyl (meth)acrylamides, and mixtures thereof. Specific examples of such post-crosslinking monomers are N-methylol acrylamide (NMA), N-methylol methacrylamide, N-isobutoxymethyl acrylamide (IBMA), N-n-butoxymethyl methacrylamide (NBMA), and mixtures thereof, possibly in combination with acrylamide. It is most preferably NMA or IBMA. The crosslinking monomer may be used in amounts of 1-20 wt. %, preferably 1-10 wt. %, most preferably 4-6 wt. %, based on the total weight of monomers. Most preferably the above N-methylol acrylamide is used in low formaldehyde form, known as NMA-LF and commercially available from Cytec Chemical, USA. In this context, the designation (meth)acrylamide is an abbreviated form for both acrylamide and methacrylamide.

The latex composition of the present invention may further comprise a vinyl sulfonate monomer. Suitable vinyl sulfonate monomers include the free vinyl sulfonic acid, a vinyl sulfonate ester, but also any appropriate alkali or alkaline earth metal salt such as sodium vinyl sulfonate. The vinyl sulfonate monomer is used in amounts of 0-5 wt. %, preferably 0.2-2 wt. %, most preferably 0.2-1.2 wt. %, based on the total weight of monomers. Addition of the vinyl sulfonate monomer enhances colloidal stability. When used in its preferred amount, it also surprisingly enhances wet resistance of a web bonded with the latex.

The latex composition of the present invention may further comprise an unsaturated carboxylic acid monomer in an amount of 0-5 wt. %, preferably 0.5-2 wt. %, based on the total weight of monomers. If present, the unsaturated carboxylic acid monomer may be selected from the group consisting of any suitable unsaturated $C_{3-6}$-carboxylic acid monomer known in the art, acrylamide, acrylonitrile, and derivatives and mixtures thereof. The unsaturated $C_{3-6}$-carboxylic acid monomer is preferably selected from the group consisting of acrylic acid, methacrylic acid, crotonic acid, itaconic acid, fumaric acid, maleic acid, and mixtures thereof, and is most preferably acrylic acid. Use of the unsaturated carboxylic acid monomer in the indicated amount is preferable to minimize coagulum and grit formation during polymerization and to enhance wet resistance of a web bonded with the latex obtained.

The latex composition of the invention is characterized in that it is obtained substantially in the absence of any protective colloid, is substantially free of such protective colloid, and preferably does not comprise such colloid at all. The term "protective colloid" as used herein means any polymer which contains water soluble groups and is used to stabilize the dispersion or latex. Typical protective colloids are polyvinyl alcohol, casein, hydroxy ethyl cellulose, carboxylmethyl cellulose and gum arabic. The expression "substantially free" as used herein means that no protective colloid is deliberately added. This does not exclude the presence of possible impurities originating from the starting materials used, which may fall under the above definition of a stabilizing polymer. Most specifically, the term "substantially free of protective colloids" (deliberately added) addresses a content of such added protective colloid below 0.1 wt. %, preferably below 0.01 wt. %, based on the total amount of monomers, and most preferably below the detection limited.

The latex composition of the present invention in its first embodiment is further characterized in that it is obtained in the presence of up to 0.1 wt. % surfactant at most, and preferably in the absence of any surfactant. The latex composition thus comprises 0 to 0.1 wt. % surfactant, more preferably 0-0.01 wt. % surfactant, and most preferably 0 wt. % surfactant, i.e. is a surfactant free composition. The addition of such minor amounts of surfactant may assist in adjusting particle size of the final latex, and may hence be advisable or desired in certain embodiments. The above surfactant content addresses deliberately added surfactant and is not intended to include possible impurities originating from any starting materials. Preferably, however, starting materially without such impurities are used.

Surfactants may, however, be added to any ready-to-use compositions including the latex composition of the invention, if desired.

In one embodiment, the latex composition of the invention comprises (a) 20-96 wt. % or 40-96 wt. %, preferably 40-95.3 wt. %, more preferably 60-93.3 wt. % vinyl ester monomer, (b) 3-60 wt. % or 3-40 wt. %, preferably 5-30 wt. % ethylene monomer, (c) 1-20 wt. %, preferably 1-10 wt. % of a post-crosslinking monomer, (d) 0-5 wt. %, preferably 0.2-2 wt. % of a vinyl sulfonate monomer, and (e) 0-5 wt. %, preferably 0.5-2.0 wt. % of unsaturated carboxylic acid monomer, wherein all percentages are based on the total weight of the monomers which is 100 wt. %.

Due to the specific selection of monomers, the surfactant content may in this case be up to 1.0 wt. % ($\leq 1.0$ wt. %) or up to 0.5 wt. % ($\leq 0.5$ wt. %), though it can also be in the range described above, i.e. below 0.1 wt. %. The specific monomer composition enables the benefits of low surfactant content on wet tensile strength of a non-woven bonded with the latex composition of the present invention, despite the slightly higher surfactant content.

The monomers (a), (b), and (c) preferably make up at least 90 wt. %, preferably at least 94 wt. % of the total weight of monomers.

In a preferred embodiment, the above latex composition according to the invention may, regardless of the surfactant content, further comprise:

(f) 0-30 wt.-%, preferably 1-10 wt. %, most preferably 3-5 wt. % of at least one copolymerizable monomer selected from the group consisting of monomers X, Y, and Z, based on the total weight of monomers, wherein (i) said monomer X is selected from the group consisting of a $C_{1-10}$ alkyl acrylate monomer, and mixtures thereof, (ii) said monomer Y is selected from the group consisting of a vinyl-$C_{5-18}$ acyl ester, an unsaturated dicarboxylic acid $C_{1-10}$ mono- and dialkyl ester, an unsaturated dicarboxylic acid anhydride, an unsaturated dicarboxylic acid mono- or diacid halide, and mixtures thereof, and (iii) said monomer Z is selected from the group consisting of a mono-ethylenically unsaturated, a water soluble functional monomer, a poly-ethylenically unsaturated pre-crosslinking monomer, a chain transfer agent, and mixtures thereof.

The $C_1$-$C_{10}$ alkyl acrylate monomer X is preferably selected from the group consisting of methyl acrylate, ethyl acrylate, propyl acrylate, butyl acrylate, 2-ethylhexyl acrylate, hydroxy ethyl acrylate, hydroxy propyl acrylate, and mixtures thereof. Most preferably the monomer X is butyl acrylate. The monomer X is preferably used in an amount of 0-15 wt. % or 0.01 to 5 wt. %, based on total weight of the monomers.

The vinyl-$C_{5-18}$-acyl ester monomer Y is preferably selected from the group consisting of vinyl esters of α-branched monocarboxylic acids having 5 to 18 carbon atoms, more preferably 5-11 carbon atoms (vinyl versatate), mixtures of vinyl versatates, and vinyl laurate. Vinyl versatate products are commercially available from Resolution Performance Products, under the tradename VeoVa® 9, VeoVa® 10 and VeoVa® 11.

The unsaturated dicarboxylic acid mono- and diester as monomer Y may be any known mono- and diester of unsaturated carboxylic diacid commonly used in the art. These generally include $C_{1-8}$ alkyl mono-and diesters of $C_{3-10}$ dicarboxylic acids such as fumaric acid, maleic acid, itaconic acid, succinic acid, and the like. Examples of the unsaturated dicarboxylic acid diester as monomer Y include di-isopropyl fumarate, di-(2-ethylhexyl) fumarate, and di-(2-ethylhexyl) maleate. The monomer Y is preferably used in an amount of 0-25 wt. %, or 0.01-15 wt. %, based on total weight of the monomers.

Usage of the $C_{1-10}$-alkyl acrylate monomer X and the vinyl-$C_{5-18}$ acyl ester monomer Y, preferably butyl acrylate and vinyl versatate, is optional, but preferred. The alkyl acrylate monomer X in the indicated amount contributes to increased storage stability of the polymer latex composition of the invention. Further increasing the amount alkyl acrylate monomer beyond the indicated amounts does, however, not provide additional storage stability or shelf life. In contrast such increased amount may reduce wet tensile strength of a non-woven product bonded with the latex dispersion obtained.

The vinyl $C_{5-18}$ acyl ester monomer Y, when used in the indicated amounts may further reduce grit formation. Further, when provided in the initial reactor charge (see below), the vinyl acyl ester monomer Y allows a surprising improvement of the wet tensile strength of a non-woven product bonded with the latex obtained, compared to provision of the same amount in a delay. In view of this improved wet tensile strength, at least 50 wt. %, preferably 50-100 wt. %, most preferably all of the monomer Y is used in the initial charge of the invention process. A further increase in the amount over the indicated 0-25 wt. %, based on total weight of the monomers, does not result in a significant further improvement.

The mono-ethylenically unsaturated water soluble functional monomer used as monomer Z may be any such monomer known in the art, including monomers containing functional groups such as sulfonic acid, phosphonic acid, carboxylic acid, acid amides and the like. Anionic functional groups are preferred. Preferably the monomer Z is selected from the group consisting of acrylamide, vinyl pyrrolidone, acrylonitrile, 2-acrylamido-propanesulfonic acid and salts thereof, and mixtures of the foregoing. Suitable salts include e.g. the sodium, potassium, calcium or ammonium salts of the above compounds.

The poly-ethylenically unsaturated pre-crosslinking monomer used as monomer Z may be any pre-crosslinking monomer known in the art which is capable of crosslinking formed polymer chains during emulsion polymerization reaction. It is preferably selected from the group consisting of divinyl adipate, allyl methacrylate, triallyl cyanurate, butanediol diacrylate, hexanediol diacrylate, divinyl benzole, and mixtures thereof. The monomer Z my also be a chain transfer agent such as an aldehyde or mercaptan as known in the art.

The monomer Z is preferably used in an amount of 0-6 wt. %, or 0.01-4 wt. %, based on total weight of the monomers. Usage of the monomer Z in the indicated amount increases colloidal stability and helps to reduce grit or coagulum formation.

A most preferred embodiment of the invention latex composition comprises:

(a) 50-90.3 wt. % of vinyl acetate,
(b) 5-30 wt. % of ethylene,
(c) 4-6 wt. % of N-methylol acrylamide,
(d) 0.2-2 wt. % of sodium vinyl sulfonate,
(e) 0.5-5 wt. %, preferably 0.5-2 wt. % of acrylic acid,
(f1) 0-15 wt. % of monomer X, preferably butyl acrylate, more preferably 0-1.5 wt. % of butyl acrylate,
(f2) 0-25 wt. % of monomer Y, preferably vinyl versatate, more preferably 0-6 wt. % of vinyl versatate, and
(f3) 0-6 wt. % of monomer Z, preferably 2-acrylamido-propanesulfonate-sodium salt (AMPS), more preferably 0-2 wt. % of 2-acrylamido-propanesulfonate-sodium salt, wherein the sum of monomers X, Y and Z is 0 to 30 wt. %, preferably 1-10 wt. %, all percentages are based on total weight of the monomers, and the total weight of the monomers is 100 wt. %.

As discussed above, the surfactant content of this embodiment can be up to 1.0 wt. %, or up to 0.5 wt. %, based on the total weight of the monomers. It can, however, also be in the lower range of up to 0.1 wt. % or below as discussed for the first embodiment of the present invention. In addition, this above preferred composition needs not comprise any surfactant for stabilization and can hence also be a surfactant free composition. The addition of the indicated higher amounts of surfactant do, however, not substantially deteriorate the wet tensile strength of a nonwoven material bonded with the latex obtained.

The latex composition of any of the preceding embodiments comprises at least 20 wt. % solids, based on total weight of the latex. Preferably the latex composition comprises 20 to 65 wt. % solids, more preferably 40 to 60 wt. % solids, based on total weight of the latex composition. Solids content may be adjusted by addition of any suitable solvent, especially water or an aqueous solution. To enhance viscosity stability of the latex, pH of the final latex composition may be adjusted to 4 to 7, preferably 4.5 to 5.5, by any suitable means. Preferably the pH is adjusted by adding an organic or mineral acid or base such as ammonia, NaOH, HCl, formic acid, acetic acid, citric acid, ascorbic acid, erythorbic acid, and the like.

The invention in a second aspect thereof provides a process of emulsion polymerization for producing a vinyl ester based polymer latex composition by free radical emulsion polymerization in an aqueous medium of a vinyl ester monomer, an ethylene monomer, and a post crosslinking monomer, which process is carried out substantially in the absence of any protective colloid, and in the presence of 0-0.1 wt. % surfactant, based on the total weight of monomers. Preferably no surfactant is present during polymerization.

The monomers used in and the latex compositions obtained by the process of emulsion polymerization of the invention are as defined above. The monomers may be polymerized using a continuous, semi-continuous or batch process for free radical emulsion polymerization, all of which are well known in the art. A semi-continuous process as defined in the present invention means any process wherein an initial charge of monomers to be polymerized is provided, to which in a second step additional monomer, initiators, solvent, pH regulators, etc., are added in one or more feeds or delays. The invention emulsion polymerization process is further preferably a pressurized process for addition of the ethylene monomer.

It is preferred that the polymerization is carried out during the second step including monomer addition at a pH$\leq$3, and most preferably in a range of 2 to 2.8. The pH may differ from those values during the initial part of the delays or towards the end of said polymerization. The pH can be adjusted by any suitable means, such as addition of an organic or mineral acid as defined above. The addition of acetic acid, ascorbic acid, citric acid, erythorbic acid or formic acid is preferred. The pH of any feed can be controlled to keep the pH of the polymerizing composition within the desired range.

In a preferred embodiment, the invention process of emulsion polymerization is a semi-continuous emulsion polymerization comprising (i) a first stage of providing an initial reactor charge including part of the monomers, and (ii) a second stage of feeding any remaining monomers and optionally initiators in one or more feeds to the initial charge. Such processes are well known in the art. Any suitable equipment can be used. After finishing the second stage the latex obtained may be discharged from the reactor or may be further processed within the same.

Polymerization is started by adding a catalytically effective amount of a free-radical forming material as known in the art. Such materials include peroxide compounds like peracetic acid, benzoyl peroxide, and persulfate salts and azo compounds. Combination-type systems employing both reducing agents and oxidizing agents, optionally in presence of a metallic catalyst, can also be used. These are commonly designated redox systems. Such redox systems will typically include a reducing agent or activator such as bisulfites, sulfoxylates, alkali metal bisulfite-ketone adducts, especially sodium formaldehyde sulfoxylate or other compounds having reducing properties such as ascorbic acid, sodium isoascorbate, erythorbic acid or other reducing sugars. The oxidizing agents include for example hydrogen peroxide, organic peroxides such as t-butyl hydroxy peroxide (t-BHP) and the like, and persulfates such as ammonium or potassium persulfate and the like. Optionally a catalyst may be used in these systems as known in the art. Examples of such a catalyst include iron such as in ferrous ammonium sulfate hexahydrate, referred to herein as ferrous ammonium sulfate.

Specific redox systems which can be used include hydrogen peroxide and zinc formaldehyde sulfoxylate; hydrogen peroxide and erythorbic acid; hydrogen peroxide, ammonium persulfate or potassium persulfate with sodium bisulfite; zinc formaldehyde sulfoxylate or sodium formaldehyde sulfoxylate; and t-butyl hydroperoxide with sodium bisulfite-ketone adduct. For a low or ultra low formaldehyde binder emulsion, which is preferred according to the present invention, the redox system will comprise a reducing agent that does not liberate formaldehyde. Such redox systems are known and may include for example ascorbic or erythorbic acid, a bisulfite or especially an alkali metal bisulfite-ketone adduct. Such systems are known and reference in this regard is made to U.S. Pat. No. 6,787,594 and EP 0 237 643, both of which are hereby incorporated herein by reference. Especially preferred are ammonium persulfate/ascorbic acid or ammonium persulfate/Na-isoascorbic acid.

Preferably initiation of the emulsion polymerization process occurs using a redox initiation system in presence of catalytic amounts of iron such as ferrous ammonium sulfate. The redox system and/or the catalyst are, preferably added as one or more feeds or delays.

The oxidizing agent is generally employed in an amount of 0.01-1.5 wt. %, preferably 0.1-1.0 wt. %, based on the weight of vinyl ester monomer in the polymerization system. The reducing agent is ordinarily added in the necessary equivalent amount.

The reaction temperature can be controlled by the rate of redox system addition i.e. the feed rate thereof during the second stage, and/or by the rate of heat dissipation via a reaction vessel wall. It is generally advantageous to maintain a reaction temperature between about 40° C. and 60° C. during polymerization of the monomers and to avoid temperatures much in excess of 80° C., although temperatures as low as 0° C. can be used. Typically, the economic lower temperature limit is about 30° C. In view of the possible pressure drop because of the ethylene reacting, it may be desirable to increase temperature in the course of the reaction. Reaction pressure will depend on the amount of ethylene to be polymerized, on temperature and on degree of reactor filling. Initial pressure within the reactor will typically not exceed 300 bar (30.9 MPa), preferably not exceed 150 bar (15.5 MPa) and most preferably not exceed 80 bar (8.24 MPa).

The pH value of the reaction mixture during the polymerization reaction can be in the range of approximately 2-7. In view of binder performance of the latex obtained, the polymerization reaction during the second stage of the claimed process (i.e. during feeding of any delays, including monomer delay) is, however, preferably carried out at a pH$\leq$3 and most preferably at a pH in the range of 2 to 2.8.

Control of pH during the polymerization reaction is carried out by adjusting the pH of the initial reactor charge and corresponding adjustment of the one or more feeds. The initial reactor charge may be adjusted to a pH of approximately 4. After the second step, including the monomer delay, the pH value is usually below 3. Afterwards, the pH can then be raised.

To provide sufficient viscosity stability of the latex product, the final pH of the latex composition obtained may be adjusted to a pH of 4 to 7, preferably 4.5 to 5.5, by adding an appropriate base, such as ammonia.

Surprisingly, a pH of $\leq$3 during the polymerization reaction has a significant impact on the post-crosslinking reaction of the latex obtained by this invention. Specifically it was found that wet tensile strength of a non-woven, preferably an air-laid non-woven product bonded with the latex composition obtained at pH$\leq$3 was significantly improved compared to a non-woven bonded with a latex obtained by polymerization at pH>3. Usage of the alkyl acrylate monomer Y in the initial reactor charge further improves storage stability or shelf life at the given low pH values during polymerization.

Reaction time will depend on variables such as temperature, free radical forming source and the desired extent of polymerization. When reference is herein made to any delay or feed, whether with respect to any monomer, the initiator or any other ingredient, it is to be understood that this includes continuous, incremental, and intermittent, i.e. stepwise additions. Continuous or intermittent additions are preferred. In the process of the invention the second stage of feeding is preferably carried out within 1 to 5 hours, preferably 2 to 4 hours, and most preferably 2 to 3 hours. Compared to any conventional process, this is a relatively fast addition of the remaining monomers. The second stage may hence also be referred to as a fast addition stage herein.

In the semi-continuous process of the invention the initial charge preferably comprises an aqueous phase containing at least a fraction of the total amount of the vinyl ester monomer, at least a fraction, but preferably all of the ethylene monomer, at least a fraction of the post-crosslinking monomer, and, if present, at least a fraction but preferably all of the vinyl sulfonate monomer. Inclusion of at least a fraction of the post-crosslinking monomer in the initial charge surprisingly helps to increase wet strength of a non-woven fabric bonded with the latex obtained from said polymerization.

It has surprisingly been found, as indicated above, that a specific partitioning of the monomers in initial charge and delays or feeds results in an improvement of the wet tensile strength of a product bonded with the latex obtained from said polymerization compared to a product bonded with a latex obtained in a batch process. Said partitioning also assists in stabilization of the latex composition of the invention. It is thus preferred to add at least a portion of the post crosslinking monomer, at least a portion but preferably all of the vinyl sulfonate monomer, if present, and also at least a portion if not all of the monomer X and the monomer Y, if present, to the initial charge. Most preferably none of the unsaturated carboxylic acid monomer, and/or the monomer Z are added to the initial charge.

In a preferred embodiment of the semi-continuous process, the employed monomers are defined as above and the initial charge comprises:

(a) 10-30 wt. % of the vinyl ester monomer, based on the total weight of vinyl ester monomer, (b) at least 50 wt. %, but preferably all of the ethylene monomer, based on the total weight of ethylene monomer, (c) 5-25 wt. % of the post-crosslinking monomer, based on the total weight of post-crosslinking monomer, (d) up to 100 wt. %, preferably 50 to 100 wt. % of the vinyl sulfonate monomer, based on the total weight of vinyl sulfonate monomer, (e) 0-2.5 wt. % of the unsaturated carboxylic acid monomer, based on the total weight of unsaturated carboxylic acid monomer, (f1) up to 100 wt. %, preferably 50 to 100 wt. % of monomer X, based on the total weight of monomers X, (f2) up to 100 wt. %, preferably 50 to 100 wt. % of monomer Y, based on the total weight of monomers Y, and (f3) up to 50 wt. %, preferably up to 10 wt % of monomer Z, based on the total weight of monomers Z.

In a preferred embodiment of the invention process the employed monomers comprise (a) 20-96 or 40-96 wt. %, preferably 60-93.3 wt. % vinyl ester monomer, (b) 3-60 or 3-40 wt. %, preferably 5-30 wt. % ethylene monomer, (c) 1-20 wt. %, preferably 1-10 wt. % of a post-crosslinking monomer, (d) 0-5 wt. %, preferably 0.2-2 wt. %, vinyl sulfonate monomer, (e) 0-5 wt. %, preferably 0.5-2 wt. % of unsaturated carboxylic acid monomer, and (f) 0-30 wt.-%, preferably 0-10 wt. %, of at least one copolymerizable monomer selected from the group consisting of monomers X, Y, and Z, as defined above, wherein all percentages are based on total weight of the monomers, and the total weight of the monomers is 100 wt. %.

As discussed above, the surfactant content of this embodiment can be up to 1.0 wt. %, or up to 0.5 wt. %, based on the total weight of the monomers. It can, however, also be in the lower range of up to 0.1 wt. % or below as discussed for the first embodiment of the present invention. In addition, this above preferred composition needs not comprise any surfactant for stabilization and can hence also be a surfactant free composition. The addition of the indicated higher amounts of surfactant do, however, not substantially deteriorate the wet tensile strength of a nonwoven material bonded with the latex obtained.

Preferably, the initial charge comprises an aqueous phase containing:

(a) 10-30 wt. % of the vinyl ester monomer, based on the total weight of vinyl ester monomer, (b) at least 50 wt. % of the ethylene monomer, based on the total weight of ethylene monomer, (c) 5-25 wt. % of the post-crosslinking monomer, based on the total weight of post-crosslinking monomer, (d) up to 100 wt. %, preferably 50-100 wt. % of the vinyl sulfonate monomer, based on the total weight of vinyl sulfonate monomer, (e) 0-2.5 wt. % of the unsaturated carboxylic acid monomer, based on the total weight of unsaturated carboxylic acid monomer, (f1) up to 100 wt. %, preferably 50-100 wt. %, most preferably all of monomer X, based on the total weight of monomers X, (f2) up to 100 wt. %, preferably 50 to 100 wt. %, most preferably all of monomer Y, based on the total weight of monomers Y, and (f3) up to 50 wt. %, preferably up to 10 wt %, most preferably none of monomer Z, based on the total weight of monomers Z.

In a more specifically preferred process the employed monomers comprise (a) 50-90.3 wt. % of vinyl acetate, (b) 5-30 wt. % of ethylene, (c) 4-6 wt. % of N-methylol acrylamide, (d) 0.2-2 wt. % of sodium vinyl sulfonate, (e) 0.5-5 wt. %, preferably 0.5-2 wt. % of acrylic acid, (f1) 0-15 wt.-% of monomer X, (f2) 0-25 wt. % of monomer Y, and (f3) 0-6 wt. % of monomer Z, with a surfactant content of up to 1.0 wt. %, see above, thought a surfactant content of $\leq 0.1$ wt. % based on total weight of monomer is preferred. For this preferred monomer composition in the semi-continuous polymerization the initial charge preferably comprises an aqueous phase containing:

(a) 10-30 wt. % of vinyl acetate, based on the total weight of vinyl acetate, (b) at least 50 wt. %, preferably 100 wt. % of ethylene, based on the total weight of ethylene, (c) 5-25 wt. % of N-methylol acrylamide, based on the total weight of N-methylol acrylamide, (d) all of the sodium vinyl sulfonate, (e) 0-2.5 wt. % of acrylic acid, based on the total weight of acrylic acid, (f1) up to 100 wt. %, preferably 50 to 100 wt. %, most preferably all of monomer X, based on the total weight of monomers X, (f2) up to 100 wt. %, preferably 50 to 100 wt. %, most preferably all of monomer Y, based on the total weight of monomers Y, and (f3) none of the monomer Z.

Most preferably, the employed monomers X, Y and Z comprise, based on total weight of monomer:

(f1) 0-1.5 wt. % of butyl acrylate, (f2) 0-6 wt. % of vinyl versatate, and (f3) 0-2 wt. % of 2-acrylamido-propanesulfonate-Na.

The initial charge then preferably comprises:

(f1) all of the butyl acrylate, (f2) all of the vinyl versatate, and (f3) none (0 wt. %) of the 2-acrylamido-propanesulfonate-Na.

In any of the above embodiments it is further preferred that the initial charge comprises at least part, if not all of the optionally used surfactant. The surfactant can, however, also be added with one or more of the feeds during the second stage. In this case the initial charge need not comprise any surfactant. No surfactant needs to be used. If more than 0.1 wt. % surfactant is used, the excess amount beyond 0.1 wt. % is preferably added it is added with a delay.

If present, the surfactant can be chosen among any suitable surfactant known in the art. Anionic, cationic and nonionic surfactants can be used. Examples of anionic surfactants are described in U.S. Pat. No. 4,447,570 which is hereby incorporated herein by reference. A detailed list of suitable surfactants may also be found in EP 1 370 621, which is also hereby incorporated herein by reference. Examples for such surfactants include but are not restricted to fatty acid ethoxylates (Genapol® ZRO or Texapon® NSO), iso-tridecyl ethoxylates (Genapol® 1879 or Genapol® 3214), sulfosuccinates (Aerosol® A102), alkyl derivatives of benzene sulfonic acid (Marlon® A315). Other examples are Soprophor® compounds such as Soprophor® 4D384 and FL, and further ABEX® compounds such as ABEX® 2005, all provided by Rhodia.

After finishing the polymerization reaction, hydrogen peroxide can further be used to complete the reaction and to diminish any possible discoloration due to the use of ascorbic acid as the reducing component. Also, a post polymerization step can be carried out using for example t-butyl hydroperoxide (t-BHP) and ascorbic acid in an aqueous solution. Further, after the polymerization a steam stripping step can be carried out in conventional manner to reduce the residual weight of the monomers. It is generally desired to provide a final latex having less than 1000 ppm, preferably less than 500 ppm and most preferably less than 200 ppm of residual monomer.

The final latex composition obtained preferably has a Tg of +10 to −30° C., more preferably +5 to −15° C. It is thereby called a soft binder, which can crosslink during application.

In a third aspect of the invention there is provided a dispersion comprising the vinyl ester based polymer latex composition described above or a latex composition obtained according to the process of the invention. Said dispersion may, besides the latex, comprise additional ingredients, depending on its intended use. These ingredients include, but are not limited to solvents, pH regulators, buffer substances, defoamer, fillers, pigments, dyes, cementitious materials, wax, UV stabilizers, wetting agents, biocide, fungicide and similar as known in the art.

A wetting agent is preferably added to the final latex product to provide a desired hydrophilicity to the non-woven fabric and product. The wetting agent is for example selected from known compounds, such as sulfosuccinates, such as dioctylsulfosuccinate, or Aerosol® OT. The wetting agent can be applied in an amount of 0.5-1 wt. %, based on the total weight of the dispersion.

The pH value of said dispersion is preferably adjusted to the range of pH 4 to 7, preferably 4.5 to 5.5 as described above. This enhances storage stability or shelf life of the latex.

The dispersion preferably has a solids content of 20 to 65 wt. %, more preferably 40 to 60 wt. %, based on the total weight of the dispersion. Solids content can be adjusted by e.g. adding an appropriate solvent, preferably an aqueous solvent such as water.

The dispersion can be brought to any conventional use of vinyl acetate/ethylene based latex compositions known in the art. Such uses especially include the use as a binder or part thereof in many products. Examples of such products are fabrics (wovens and non-wovens), textiles, paper, carpets, coatings, inks, paints, or adhesives, but also construction materials. The use as a binder for non-wovens is especially preferred.

In a further aspect the invention thus provides a product comprising the above dispersion. This product may be selected from the group consisting of fabrics (wovens and non-wovens, the latter being preferred), textiles, leather, paints, inks, coatings, paper, adhesives, wood glues, binders, carpet backings, food coatings and construction materials.

In a preferred embodiment the product is a non-woven fabric wherein the fibers are bonded by the invention dispersion. Such non-wovens may be made from one or more natural and synthetic fibers, such as cellulose, wood pulp, silk, viscose rayon, polyester, polypropylene, polyamide, metal, glass and the like. The fibers may be formed into non-woven webs by a variety of technologies known in the art such as dry-lay, wet-lay or air-lay technologies. An air-laid web is preferred.

The product may be a paint or a coating formulation, useful in interior or exterior wall painting, wherein the aqueous dispersion formulation of the invention is used as at least part of the paint or coating formulation.

The product may be an adhesive or a wood glue formulation, wherein the aqueous dispersion formulation of the invention is used as at least part of the adhesive formulation.

The invention also provides for a method of bonding a fabric, especially a non-woven fabric using the vinyl ester based polymer latex or the dispersion of the invention as a binder.

The invention further provides for a method of coating a substrate, wherein the coating applied comprises the vinyl ester based polymer latex or the dispersion of the invention. The method preferably is a method of coating a textile product or paper. Said coating may be applied by a printing process, and the coating may in this case be a decorative coating comprising a dye and/or pigment in addition to the latex of the invention.

The invention further provides for a method of treating or finishing a leather product using the vinyl ester based polymer latex or the dispersion of the invention.

The following examples are provided to further illustrate the present invention, but are not to be construed as to limiting the same.

EXAMPLES

The following test methods have been applied to demonstrate the superior properties of the polymer latex composition according to the invention.

1. Test-Method for Estimation of Air-Laid Performance a) Impregnation of Air-Laid Material A 75 g air-laid web (88 wt. % wood pulp, 12 wt. % Bico-Fibers) was impregnated by spraying using a diluted polymer dispersion of 20 wt. % of solid content in order to obtain a 20 wt. % add-on to the air-laid web. The impregnated air-laid web was stored over night under 23° C. and 50% humidity.

b) Determination of Wet Tensile Strength

Tensile strength of the impregnated air-laid web was measured by Zwick 1446 equipment at 23° C. The samples were soaked in the Finch Cup with water for 15 seconds before the measurement. A force was applied in the length direction at a constant rate of strain to a bonded sample of 10 cm length and 5 cm width under wet conditions (Finch Cup). The values of the maximum tensile strength and maximum tensile elongation are taken from the Force-Elongation and the average values from 10 measurements were used for the result report.

c) Comparison and Presentation of Results of Wet Tensile Strength

For comparison all polymer dispersion binders of the following Examples were tested against a standard. The dispersion binder of comparative Example 2 was selected as the standard. All dispersion binders of the following Examples were adjusted to the same pH value of pH=4 at the same solids content of 50 wt. % before preparing dilutions for spray applications. In all cases a fixed amount of a wetting agent (dioctyl sulfosuccinate) was added to provide approximately the same hydrophilicity of the web, measured as speed and capacity of water take up.

The result of wet tensile strength obtained for the standard was defined as 100% for all test series.

2. Estimation of Particle Size

The final polymer dispersion particle sizes were characterized using a COULTER LS230, supplied by Coulter Corporation, Miami, Fla. For the measurement samples of the final polymer dispersion were diluted to an appropriate concentration.

Coulter LS230 measurement is based on light diffraction combined with some static light scattering and provides a particle size distribution. The mode of volume density particle size distribution was adopted to characterize particle size.

3 Estimation of Grit

A 100 g sample of polymer dispersion was diluted with distilled water (up to 1 L) and filtered through a nylon sieve of 150 μm and subsequently through a sieve of 40 μm. Sieves were rinsed with sufficient water until only pure water passed the sieves. The residual on the sieves was dried to constant mass. Total grit content >40 μm was calculated from the dried residual on both sieves and is given in parts per million (ppm) based on polymer latex.

A low grit content is preferred to avoid complications during filtration processes or during application by spray processes. If the score of filtration test was better than 3, a maximum total grit content of 300 ppm of particles larger than 40 μm is acceptable. Products, having a grit content of less than approximately 200 ppm of particles larger than 40 μm, are preferred.

4 Filtration Test

A 150 ml sample of polymer dispersion was filtered through a nylon sieve of 60 μm into a 250 ml beaker. This ensured that any grit content above 60 μm is removed before the filtration test. A 100 ml sample of this sample was then sucked by vacuum application through a marked circular area of approx. 1 cm² of a nylon sieve of 60 μm.

The percentage of plugged area of the marked circular area was usually inspected after cautious removal of remaining fluid dispersion with water, and subsequent drying.

Ability of filtration was then characterized by following scores:

1: no mesh pores were plugged; excellent filtration;
2: only sporadic plugged mesh pores; good filtration;
3: up to 50% of the marked area was plugged; filtration possible,
4: more than 50% of the marked area was plugged; filtration would take additional effort;
5: 100% of marked area was plugged; filtration not possible.

In the case of score 4, industrial use requires additional efforts for filtration. In the case of score 5, industrial use would not be possible.

Example 1 (Comparison)

AIRFLEX® EN1020 vinyl acetate-ethylene (VAE) polymer emulsion is a standard soft vinyl acetate/ethylene/N-methylol acrylamide copolymer binder available from Air Products and was used as a reference. AIRFLEX EN1020 VAE polymer emulsion comprises above 2 wt. % surfactant and no protective colloid.

Example 2 (Comparison)

Example 2 was used as a standard to compare the performance of the bonded air-laid webs. Wet tensile strength obtained by Example 2 was taken as 100% for all test series for the following examples. The emulsion polymerization of Example 2 was carried out in 18 L pressure reactor. Initial reactor charge was as follows: 4209 g ion exchanged water, 106.5 g of Genapol® X150 surfactant (40%) and 20.8 g of Aerosol® A102 surfactant (30%), 42.3 g of Na vinyl sulfonate (25%), 30 g benzoquinone (0.1%), and 40 g of Na citrate (10%) were homogenized followed by pH adjustment to 3.8 using 10% of citric acid addition. Then a monomer composition consisting of 5256 g of vinyl acetate and 53 g of butyl acrylate was added. The reactor was heated to 50 C and pressurized with 1700 g of ethylene. When the temperature reached 40° C., 55.5 g of ascorbic acid (5 wt. %) and 21 g of ferrous ammonium sulfate (1 wt. %) were pumped in. The reaction is started by continuous delay of an ammonium persulfate (APS 10 wt. %) solution with a rate of 62 g/h.

When the reaction became exothermic, an aqueous N-methylol acrylamide feed comprising: 416 g of water, 289.5 g of Aerosol® A102 surfactant (30 wt. %), 44 g of acrylic acid, 664 g of N-methylol acrylamide-LF (48 wt. %), and 36 g of benzoquinone, was started. The addition of this aqueous feed was continued over 5 hours. Parallel to this feed two redox initiator solutions of APS (10 wt. %) and of ascorbic acid (5 wt. %) respectively, were metered in continuously at a rate of 39 g/h for each. At 210 min after start of delay, a vinyl acetate monomer feed of 526 g was started and metered in for 90 min. Both, the vinyl acetate and the N-methylol acrylamide feed ended at the same time.

Delay of redox components was continued for 60 more minutes. After completion of the reaction, the pH was adjusted to pH=4.5 using ammonia. Then product was transferred to a degasser where full vacuum was applied. Solid content was adjusted to 50%.

Example 3

The polymerization was carried out in a 2 L pressure reactor. The initial reactor charge consisted of:

| | |
|---|---|
| Water | 496 g |
| N-methylol acrylamide-LF (48%) | 17 g |
| Na vinyl sulfonate (25%) | 22.7 g |
| vinyl acetate | 171 g |
| butyl acrylate | 7.1 g |
| VeoVa ® 10 | 28.4 g |
| ethylene | 233 g |

The pH of the aqueous components was adjusted to 4 with formic acid. Before adding the monomers vinyl acetate, butyl acrylate and VeoVa®10, the aqueous solution was purged twice by applying vacuum and nitrogen followed by the addition of 4 g of ferrous ammonium sulfate as a 1% aqueous solution. Temperature was controlled to be nearly constant at 50° C. After 233 g of ethylene was added, the pressure was kept constant at approx. 68 bar during the following reaction, allowing further addition of 20 g of ethylene, then the ethylene feed was terminated.

Reaction was started by parallel feeds of two aqueous initiator solutions consisting of:

Feed 1: ammonium persulfate (10% aqueous solution)

Feed 1 was continuously added at 13.4 ml/h and finished 60 min after feeds 3 and 4 were complete.

Feed 2: ascorbic acid (5% aqueous solution)

Feed 2 was continuously added at 13.4 ml/h, parallel to feed 1.

| | |
|---|---|
| Feed 3: vinyl acetate | 500 g |

Feed 3 was continuously added at 148.7 ml/h over approximately 215 min, started 10 min after reaction became exothermic.

Feed 4:

| | |
|---|---|
| Water | 47 g |
| Genapol ® ZRO (28%) | 30.3 g |
| N-methylol acrylamide-LF (48%) | 85 g |
| acrylic acid | 13.8 g |

The pH of this aqueous solution was adjusted to pH=3.8 with ammonia.

Feed 4 was continuously added at 49.1 ml/h parallel to feed 3

Feed 5: hydrogen peroxide (10% aqueous solution) in an amount of 1% based on the total weight of dispersion. Feed 5 was added after feeds 1 and 2 were finished.

A sufficient amount of ammonia (12.5% aqueous solution) was added to adjust the final pH of the latex to 5. The product was transferred to degasser and treated with vacuum. The solids content was adjusted to 50% by adding water.

Example 4

Example 4 was a reproduction of Example 3.

Example 5

Example 5 used the same composition and procedure as Example 3 except that the initial reactor charge contained only 233 g of ethylene, without charging another 20 g of ethylene as in Example 3.

Example 6

The polymerization was carried out in a 2 L pressure reactor. The procedure was comparable to the one of Example 3.

The initial reactor charge consisted of:

| | |
|---|---|
| Water | 519 g |
| N-methylol acrylamide-LF (48%) | 8.9 g |
| Na vinyl sulfonate (25%) | 23.8 g |
| vinyl acetate | 179 g |
| ethylene | 233 g |

The pH of the aqueous charge was adjusted to a pH of 4 with formic acid. Four grams of ferrous ammonium sulfate were added as a 1% aqueous solution. The temperature was maintained at a nearly constant 50° C. The initial pressure was approx. 66 bar.

Feed 1: ammonium persulfate (10% aqueous solution)

Feed 1 was continuously added at 13.4 ml/h and finished 60 min after feeds 3 and 4 were completed.

Feed 2: ascorbic acid (5% aqueous solution)

The feed was continuously added at 13.4 ml/h, parallel to feed 1.

| | |
|---|---|
| Feed 3: vinyl acetate | 556 g |

The feed was continuously added at 148.9 ml/h over approximately 240 min and started 10 min after the reaction became exothermic.

Feed 4:

| | |
|---|---|
| Water | 63.9 g |
| N-methylol acrylamide-LF (48%) | 89 g |

The pH of this aqueous solution was adjusted to 3.8 with formic acid. Feed 4 was continuously added at 38.8 ml/h in parallel to feed 3

Feed 5: hydrogen peroxide (10% aqueous solution) in an amount of 1% based on the total weight of dispersion. Feed 5 was added after feeds 1 and 2 finished An amount of ammonia (12.5% aqueous solution) was added to adjust the final pH to 5. The product was transferred to a degasser and treated with vacuum. The final solids content was adjusted to 50% by adding water.

Example 7

The polymerization was carried out in a 2 L pressure reactor. The procedure was comparable to the one of Example 6. The initial reactor charge consisted of:

| | |
|---|---|
| Water | 542.8 g |
| N-methylol acrylamide-LF (48%) | 8.9 g |
| vinyl acetate | 179 g |
| ethylene | 233 g |

The pH of the aqueous components was adjusted to a pH of 4 with formic acid. Four grams of ferrous ammonium sulfate were added as a 1% aqueous solution. The temperature was controlled to be nearly constant 50° C. The initial pressure was approx. 66 bar.

Feed 1: ammonium persulfate (10% aqueous solution)

The feed was continuously added at 13.4 ml/h and finished 60 min after feeds 3 and 4 were completed.

Feed 2: ascorbic acid (5% aqueous solution)

The feed was continuously added at 13.4 ml/h, parallel to feed 1.

| Feed 3: vinyl acetate | 556 g |
|---|---|

The feed was continuously added at 148.9 ml/h over approx. 240 min, and started 10 min after reaction became exothermic.

Feed 4 consisted of:

| Water | 49.5 g |
|---|---|
| N-methylol acrylamide-LF (48%) | 89 g |
| acrylic acid | 14.4 g |

The pH the aqueous solution was adjusted to 3.8 with ammonia. Feed 4 was continuously added at 38.6 ml/h, parallel to feed 3

Feed 5: hydrogen peroxide (10% aqueous solution) in an amount of 1%, based on the total weight of dispersion. Feed 5 was added after feeds 1 and 2 finished. An amount of ammonia (12.5% aqueous solution) was added to adjust the final pH to 5. The product was transferred to a degasser and treated with vacuum. The final solids content was adjusted to 50 wt. % with water.

Example 8

Same as Example 6 except that the initial reactor charge consisted of:

| Water | 519 g |
|---|---|
| N-methylol acrylamide-LF (48%) | 17.8 g |
| Na vinyl sulfonate (25%) | 23.8 g |
| vinyl acetate | 179 g |
| butyl acrylate | 7.4 g |
| ethylene | 233 g | and Feed 4 contained:

| Water | 49.5 g |
|---|---|
| N-methylol acrylamide-LF (48%) | 89 g |
| acrylic acid | 14.4 g |

The pH of the aqueous solution was adjusted to 3.8 with ammonia. Feed 4 was continuously added at 38.6 ml/h, parallel to feed 3.

Example 9

Same as Example 8 except that initial reactor charge contained 7.4 g of VeoVa® 9 instead of butyl acrylate.

Example 10

Same as example 8 except that the initial reactor charge consisted of:

| Water | 519 g |
|---|---|
| N-methylol acrylamide-LF (48%) | 26.7 g |
| Na vinyl sulfonate (25%) | 23.8 g |
| vinyl acetate | 179 g |
| VeoVa® 9 | 29.6 g |
| ethylene | 233 g |

Example 11

Example 11 was a reproduction of Example 10.

Example 12

Same as example 8 except that the initial reactor charge consisted of:

| Water | 519 g |
|---|---|
| N-methylol acrylamide-LF (48%) | 8.9 g |
| Na vinyl sulfonate (25%) | 23.8 g |
| vinyl acetate | 179 g |
| VeoVa® 9 | 29.6 g |
| ethylene | 233 g |

Example 13

Same as Example 8 except that the initial reactor charge contained 29.6 g of VeoVa® 9 instead 7.4 g of butyl acrylate.

Example 14

Same as example 8 except that the initial reactor charge consisted of:

| Water | 519 g |
|---|---|
| N-methylol acrylamide-LF (48%) | 26.7 g |
| Na vinyl sulfonate (25%) | 23.8 g |
| vinyl acetate | 179 g |
| butyl acrylate | 7.4 g |
| VeoVa® 9 | 29.6 g |
| ethylene | 233 g |

Example 15

Same as example 8 except that the initial reactor charge consisted of:

| Water | 519 g |
|---|---|
| N-methylol acrylamide-LF (48%) | 26.7 g |
| Na vinyl sulfonate (25%) | 23.8 g |
| vinyl acetate | 179 g |
| VeoVa® 11 | 29.6 g |
| ethylene | 233 g |

Example 16

Polymerization was carried out in a 2 L pressure reactor. The initial reactor charge consisted of:

| | |
|---|---|
| Water | 500 g |
| N-methylol acrylamide-LF (48%) | 17.1 g |
| Na vinyl sulfonate (25%) | 22.9 g |
| vinyl acetate | 172.3 g |
| butyl acrylate | 7.1 g |
| VeoVa ® 10 | 28.5 g |
| ethylene | 224 g |

The pH of the aqueous phase was adjusted to 4 with formic acid. Four grams of ferrous ammonium sulfate were added as a 1% aqueous solution. Temperature was controlled at 50° C. The initial pressure was approx. 66 bar.

Feed 1: ammonium persulfate (10% aqueous solution)

Feed 1 was started at 15 ml/h and raised to 19 ml/h when feeds 3 and 4 were started.

Feed 1 was finished 60 min after feeds 3 and 4 were complete.
Feed 2: ascorbic acid (5% aqueous solution)

Feed 2 was added parallel to feed 1 using the same feeding rates.

| | |
|---|---|
| Feed 3: vinyl acetate | 506 g |

Feed 3 was continuously added at 180.6 ml/h over approx. 180 min; started 10 min after the reaction became exothermic.
Feed 4 consisted of:

| | |
|---|---|
| Water | 47.5 g |
| ABEX ® 2005 (30%) | 14.3 g |
| N-methylol acrylamide-LF (48%) | 85.7 g |
| Acrylic acid | 13.9 g |

The pH of this aqueous solution was adjusted to 3.9 with ammonia. Feed 4 was continuously added with 55.3 ml/h parallel to feed 3.

Feed 5: hydrogen peroxide (10% aqueous solution) in an amount of 1% based on total amount of dispersion. Feed 5 was added after feeds 1 and 2 were finished Ammonia (12.5% aqueous solution) was added to adjust the final pH to 5. The product was then transferred to degasser and treated with vacuum. The solids content was adjusted to 50% by addition of water.

Example 17

Same as Example 3 except that the initial reactor charge contained only 233 g of ethylene and no further ethylene was added during the reaction.
Feed 4 consisted of:

| | |
|---|---|
| Water | 77.6 g |
| N-methylol acrylamide-LF (48%) | 85 g |
| acrylic acid | 20.7 g |

The pH of this solution was adjusted to 3.8 with ammonia.

Feed 4 was continuously added at 51.2 ml/h, parallel to feed 3.

Example 18

Same as example 6 except that the initial reactor charge contained 26.7 g of N-methylol acrylamide-LF (48%) and 29.6 g of vinyl laurate.

Feed 4 additionally contained 14.4 g of acrylic acid, the amount of water being reduced by the same number; pH of feed 4 was adjusted to 3.8.

Example 19

Same as Example 18 except that the vinyl laurate in the initial reactor charge was replaced by the same amount of di-(2-ethylhexyl)fumarate.

Example 20

Same as Example 19 except that the di-(2-ethylhexyl)fumarate in the initial reactor charge was replaced by the same amount of VeoVa® 9 and feed 4 additionally contained 10.8 g of a 50% solution of AMPS (Lubrizol® 2403A).

Example 21

Polymerization was carried out in a 2 L pressure reactor. The initial reactor charge consisted of:

| | |
|---|---|
| Water | 500.5 g |
| N-methylol acrylamide-LF (48%) | 17.1 g |
| Na vinyl sulfonate (25%) | 22.9 g |
| vinyl acetate | 172.3 g |
| butyl acrylate | 7.1 g |
| VeoVa ® 10 | 28.5 g |
| ethylene | 224 g |

The pH of the aqueous phase was adjusted to 4 with formic acid. 3.9 grams of ferrous ammonium sulfate were added as a 1% aqueous solution. Temperature was maintained at 50° C. giving an initial pressure of approx. 65 bar.

Feed 1: ammonium persulfate (10% aqueous solution)

Feed 1 was started at 12.9 ml/h and raised to 16.1 ml/h when feeds 3 and 4 were started. Feed 1 was finished 60 min after feeds 3 and 4 were complete.

Feed 2: ascorbic acid (5% aqueous solution)

Feed 2 was added parallel to feed 1 using the same feeding rates.

| | |
|---|---|
| Feed 3: vinyl acetate | 506 g |

Feed 3 was continuously added at 180.6 ml/h over approx. 180 min, started 10 min after reaction became exothermic.
Feed 4 consisted of:

| | |
|---|---|
| Water | 47.6 g |
| Genapol ® ZRO (28%) | 30.5 g |
| N-methylol acrylamide-LF (48%) | 85.7 g |
| Acrylic acid | 13.9 g |

The pH of this aqueous solution was adjusted to pH=3.8 with ammonia.

Feed 4 was continuously added at 59.4 ml/h parallel to feed 3.

Feed 5: hydrogen peroxide (10% aqueous solution) in an amount of 1% based on total amount of dispersion. Feed 5 was added after feeds 1 and 2 were finished Ammonia (12.5% aqueous solution) was added to adjust the final pH to 5. The product was transferred to a degasser and treated with vacuum. The solids content was adjusted to 50% by addition of water.

Example 22

The same composition and procedure as Example 21 except that the aqueous phase of the initial reactor charge additionally contained 1.2 grams of Genapol® ZRO (28%).

Example 23

The same composition and procedure as Example 21 except that the aqueous phase of the initial reactor charge additionally contained 2.4 grams of Genapol® ZRO (28%).

Example 24

Polymerization was carried out in a 580 L pressure reactor. The procedure was comparable to Example 4. The initial reactor charge consisted of:

| | |
|---|---|
| Water | 160.50 kg |
| N-methylol acrylamide-LF (48%) | 5.42 kg |
| Na vinyl sulfonate (25%) | 7.25 kg |
| vinyl acetate | 54.50 kg |
| butyl acrylate | 2.25 kg |
| VeoVa ® 10 | 9.00 kg |
| ethylene | 71.00 kg |

The pH of the aqueous phase was adjusted to 4 with formic acid. 12.8 grams of ferrous ammonium sulfate were added. Temperature was maintained at 50° C. giving an initial pressure of approx. 65 bar.

Feed 1: ammonium persulfate (10% aqueous solution)

Feed 1 was started with 4.6 kg/h and was raised to 5.75 kg/h when feeds 3 and 4 were started. Feed 1 was finished 60 min after feeds 3 and 4 were complete.

Feed 2: ascorbic acid (5% aqueous solution)

Feed 2 was added parallel to feed 1 using the same feed rates.

| | |
|---|---|
| Feed 3: VAC | 160 kg |

Feed 3 was continuously added at 53.3 kg/h over 180 min; started when initial solids was approx. 10%.

Feed 4 contained:

| | |
|---|---|
| Water | 15.00 kg |
| Genapol ® ZRO (28%) | 9.65 kg |
| NMA-LF (48%) | 27.10 kg |
| Acrylic acid | 4.38 kg |

The pH of this aqueous solution was adjusted to pH=3.8 by means of ammonia. Feed 4 was continuously added at 19.2 kg/h parallel to feed 3

Feed 5: hydrogen peroxide (10% aqueous solution) in an amount of 1% based on total amount of dispersion. Feed 5 was added after feeds 1 and 2 were finished Ammonia (12.5% aqueous solution) was added to adjust the final pH to 5. The product was transferred to a degasser and treated with vacuum. The solids content was adjusted to 50% by addition of water.

Example 25 (Comparison)

The same composition and procedure as Example 3 except that the aqueous solution of feed 4 was adjusted to a pH of 4.5. The different pH adjustment led to a polymerization pH in the reactor of 4.4±0.2.

Example 26 (Comparison)

The same composition and procedure as Example 3 except that the aqueous solution of feed 4 was adjusted to a pH of 5.0. The different pH adjustment led to a polymerization pH in the reactor of 5.1±0.2

The data in the Table (below) is a summary of the performance of the polymer dispersions obtained in Examples 1 to 26, when binders were applied to an air-laid web as described by the test method. It also contains additional analytical data characterizing the polymer dispersions.

| Example No | wet tensile strength, (%)* | Particle size (nm)** | grit >40 µm, ppm | filtration test | Surfactant (%)*** | pH**** |
|---|---|---|---|---|---|---|
| 1 Comparison | 94 | 225 ± 25 | <200 | 1 | >2 | n.d. |
| 2 Comparison | 100 | 330 | <200 | 2 | 1.68 | n.d. |
| 3 | 120 | 326 | 134 | 1 | 0.83 | 2.6 |
| 4 | 117 | 326 | 93 | 1 | 0.83 | 2.7 |
| 5 | 116 | 326 | 88 | 1 | 0.85 | 3.0 |
| 6 | 119 | 431 | 3,025 | 4 | 0.00 | 2.1 |
| 7 | 115 | 1100 | 15,669 | 5 | 0.00 | 2.4 |
| 8 | 120 | 383 | 183 | 2 | 0.00 | 2.6 |
| 9 | 120 | 431 | 167 | 2-3 | 0.00 | 2.5 |
| 10 | 129 | 431 | 81 | 1 | 0.00 | 2.6 |
| 11 | 129 | 393 | 145 | 1 | 0.00 | 2.7 |
| 12 | 122 | 431 | 160 | 1 | 0.00 | 2.6 |
| 13 | 126 | 431 | 158 | 1 | 0.00 | 2.6 |
| 14 | 124 | 358 | 128 | 1-2 | 0.00 | 2.8 |
| 15 | 122 | 431 | 265 | 1 | 0.00 | 2.6 |
| 16 | 122 | 326 | 92 | 1 | 0.42 | 2.7 |

-continued

| Example No | wet tensile strength, (%)* | Particle size (nm)** | grit >40 μm, ppm | filtration test | Surfactant (%)*** | pH**** |
|---|---|---|---|---|---|---|
| 17 | 119 | 326 | 2,364 | 4 | 0.00 | 3.5 |
| 18 | 123 | 431 | 285 | 1-2 | 0.00 | 2.6 |
| 19 | 126 | 358 | 278 | 2-3 | 0.00 | 2.5 |
| 20 | 129 | 393 | 188 | 1 | 0.00 | 2.4 |
| 21 | 117 | 326 | 50 | 1 | 0.85 | 2.9 |
| 22 | 112 | 271 | 80 | 1 | 0.88 | 2.8 |
| 23 | 113 | 170 | 98 | 1 | 0.92 | 2.9 |
| 24 | 118 | 297 | 54 | 1 | 0.85 | 2.6 |
| 25 Comparison | 105 | 358 | 138 | 1 | 0.83 | 4.4 |
| 26 Comparison | 88 | 326 | 69 | 1 | 0.83 | 5.1 | n.d. = no data
*based on Standard of Example 2 set to 100%
**mode of volume density distribution as obtained from COULTER ® LS 230
***wt. % of surfactant based on the total weight of monomers
****pH during second stage of polymerization process including the monomer delay It is apparent from the data in the Table that, based on the composition and/or on the process of this invention, it is possible to improve wet tensile strength by approx. 10-20%, compared to comparative Examples 1 and 2, by reducing the surfactant content to $\leq$1 wt. % (Ex. 3 to 5 and 21 to 24), which is a considerable improvement. Such improvement is even more pronounced when the surfactant level is further reduced to $\leq$0.1 wt. % or is zero (Ex. 10 to 15 and 18 to 20).

A minor surfactant content below 1 wt. %, on the other hand reduces grit and particle size (see Ex. 3-5, 16, and 21-24, compared to the remaining examples). However, polymerization at a pH below 3 still allows to improve wet tensile strength in a non-woven, bonded with the latex, despite of higher surfactant content (see Ex. 3 and 4 versus Ex. 25 and 26).

Particle size can be adjusted by adding less than 0.1 wt. % of surfactant into the initial reactor charge (Ex. 22 and 23 compared to Ex. 21). Particle size and grit content at low (or zero) surfactant content can, however, also be adjusted by monomer compositions (Ex. 6 to 20).

The above examples are intended for illustration purposes only. The skilled worker will appreciate suitable modifications without departing from the spirit of this invention and the scope of the claims which follow.

What is claimed is:

1. An emulsion polymerization process for producing a vinyl ester based polymer latex in an aqueous medium, said polymer comprising polymerized units of:
   (a) 40-95.3 wt. % vinyl ester monomer
   (b) 5-30 wt. % ethylene monomer
   (c) 1-10 wt. % post-crosslinking monomer,
   (d) 0.2-2 wt. % vinyl sulfonate monomer, and
   (e) 0.5-2 wt. % unsaturated carboxylic acid monomer,
   based on the total weight of monomers,
   wherein the process is carried out substantially in the absence of any added protective colloid and in the presence of from 0 to 1.0 wt. % of surfactant, based on the total weight of the monomers,
   wherein the process comprises
   (i) a first stage of providing an initial reactor charge comprising an aqueous phase comprising
      a) 10-30 wt. % of the vinyl ester monomer, based on total weight of vinyl ester monomer,
      b) at least 50 wt. % of the ethylene monomer, based on total weight of ethylene monomer,
      c) 5-25 wt. % of the post-crosslinking monomer, based on the total weight of post-crosslinking monomer, and
      d) 50-100 wt. % of the vinyl sulfonate monomer, based on total weight of vinyl sulfonate monomer, and
   (ii) a second stage of feeding any remaining monomers and optionally a polymerization initiator system in one or more feeds to the initial charge,
   wherein the vinyl ester polymer latex has a solids content of at least 20 wt. %.

2. The process of claim 1 wherein surfactant is present at 0-0.1 wt. % based on the total weight of monomers.

3. The process of claim 1 wherein the initial reactor charge contains no surfactant.

4. The process of claim 1 wherein said second stage comprises polymerization substantially carried out at a pH$\leq$3.

5. The process of claim 1 wherein the vinyl ester based polymer latex further comprises polymerized units of:
   (f) 0-30 wt. % of at least one copolymerizable monomer selected from the group consisting of monomers X, Y, and Z,
      wherein all percentages are based on the total weight of monomers, and the total weight of monomers is 100 wt. %, and wherein
      (f1) monomer X is selected from the group consisting of $C_{1-10}$ alkyl acrylate monomers and mixtures thereof,
      (f2) monomer Y is selected from the group consisting of vinyl-$C_{5-18}$ acyl esters, unsaturated dicarboxylic acid $C_{1-10}$ mono and dialkyl esters, unsaturated dicarboxylic acid anhydrides, unsaturated dicarboxylic acid mono- or diacid halides, and mixtures thereof, and
      (f3) monomer Z is selected from the group consisting of a monoethylenically unsaturated, water soluble functional monomers, polyethylenically unsaturated precrosslinking monomers, chain transfer agents, and mixtures thereof.

6. The process of claim 5 wherein
monomer (a) comprises vinyl acetate,
monomer (c) comprises N-methylol acrylamide
monomer (d) comprises sodium vinyl sulfonate,
monomer (e) comprises acrylic acid, and
monomer (f) comprises:

(f1) 0-1.5 wt. % butyl acrylate (f2) 0-6 wt. % vinyl versatate (f3) 0-2 wt. % 2-acrylamido-propanesulfonate-sodium salt.

7. The process of claim 6 wherein the initial reactor charge contains no surfactant.

8. The process of claim 6 wherein said second stage comprises polymerization substantially carried out at a pH≦3.

* * * * *